(12) United States Patent
Zhang et al.

(10) Patent No.: US 10,492,188 B2
(45) Date of Patent: Nov. 26, 2019

(54) METHOD OF AND APPARATUS FOR PRE-CODED PHYSICAL DOWNLINK CONTROL CHANNEL REFERENCE SIGNAL AND BLIND DECODING

(75) Inventors: Xiaobo Zhang, Shanghai (CN); Fang-Chen Cheng, Randolph, NJ (US)

(73) Assignee: Alcatel Lucent, Nozay (FR)

( * ) Notice: Subject to any disclaimer, the term of this patent is extended or adjusted under 35 U.S.C. 154(b) by 399 days.

(21) Appl. No.: 14/234,523

(22) PCT Filed: Jul. 23, 2012

(86) PCT No.: PCT/IB2012/001661
§ 371 (c)(1),
(2), (4) Date: Jan. 23, 2014

(87) PCT Pub. No.: WO2013/017946
PCT Pub. Date: Feb. 7, 2013

(65) Prior Publication Data
US 2014/0177581 A1   Jun. 26, 2014

(30) Foreign Application Priority Data

Jul. 29, 2011   (CN) .......................... 2011 1 0216801

(51) Int. Cl.
*H04W 72/04*   (2009.01)
*H04L 1/00*   (2006.01)
*H04L 5/00*   (2006.01)

(52) U.S. Cl.
CPC ......... *H04W 72/042* (2013.01); *H04L 1/0038* (2013.01); *H04L 1/0046* (2013.01); *H04L 5/0007* (2013.01); *H04L 5/0053* (2013.01)

(58) Field of Classification Search
CPC ... H04W 72/042; H04W 48/12; H04W 24/10; H04W 72/044; H04W 72/08;
(Continued)

(56) References Cited

U.S. PATENT DOCUMENTS

2010/0120442 A1   5/2010  Zhuang et al.
2011/0085506 A1*  4/2011  Lee ...................... H04L 5/0023
                                                        370/329
(Continued)

FOREIGN PATENT DOCUMENTS

CN        101964676 A         2/2011
JP        2010/279053        12/2010
(Continued)

OTHER PUBLICATIONS

Huawei, et al., "Investigation on downlink control channel and signaling enhancements", R1-111253, 3GPP TSG RAN WG1 meeting #65, Barcelona, Spain, May 9-13, 2011.
(Continued)

*Primary Examiner* — Hardikkumar D Patel
(74) *Attorney, Agent, or Firm* — Fay Sharpe LLP

(57) ABSTRACT

The invention proposes a method of and apparatus for a pre-coded physical downlink control channel reference signal and blind decoding. In a design of the reference signal, the demodulation reference signal is used for demodulating physical downlink control channel signaling, wherein the physical downlink control channel signaling is embedded in a physical downlink shared channel, an the demodulation reference signal is included in a control channel element. In a method for a user equipment to perform blind decoding, the user equipment obtains blind decoding indication information from a base station, the blind decoding indication information including an indication of a search space in which the user equipment performs the blind decoding, wherein the search space includes a control channel element of a traditional physical downlink control channel and further includes a control channel element of a pre-coded physical downlink control channel; and performs blind decoding for the number of searches indicated by the blind decoding indication information in the search space indi-
(Continued)

cated by the blind decoding indication information, according to the blind decoding indication information.

8 Claims, 3 Drawing Sheets

(58) Field of Classification Search
CPC ..... H04W 72/14; H04W 72/04; H04W 76/10; H04W 84/047; H04W 88/04; H04W 40/22; H04W 72/0406; H04L 1/0038; H04L 1/0046; H04L 5/0053; H04L 5/0023; H04L 5/005; H04L 5/0051; H04L 5/0064; H04L 5/0037; H04L 5/0044; H04L 5/0092; H04L 1/0072; H04L 2001/0097; H04L 5/0082; H04L 5/0039; H04L 5/001; H04L 5/0091; H04L 5/0096; H04L 5/009; H04L 5/0007; H04L 5/0087; H04L 5/0094

See application file for complete search history.

(56) References Cited

U.S. PATENT DOCUMENTS

| | | | |
|---|---|---|---|
| 2011/0170496 A1 | 7/2011 | Fong et al. | |
| 2012/0106501 A1 | 5/2012 | Kishiyama et al. | |
| 2012/0250641 A1* | 10/2012 | Sartori | H04W 48/12 370/329 |
| 2012/0250642 A1* | 10/2012 | Qu | H04W 48/12 370/329 |
| 2012/0281594 A1* | 11/2012 | Stewart | H04W 16/14 370/259 |
| 2013/0058286 A1* | 3/2013 | Takeda | H04W 72/042 370/329 |
| 2013/0223402 A1* | 8/2013 | Feng | H04L 5/0007 370/330 |
| 2014/0003349 A1 | 1/2014 | Kang et al. | |
| 2014/0086201 A1 | 3/2014 | Nagata et al. | |
| 2015/0023292 A1 | 1/2015 | Nishio et al. | |

FOREIGN PATENT DOCUMENTS

| | | |
|---|---|---|
| JP | 2012-235354 | 11/2012 |
| JP | 2014-511056 | 5/2014 |
| KR | 10-2011-0038994 | 4/2011 |
| WO | WO 2010/053984 | 5/2010 |
| WO | WO 2010/107013 | 9/2010 |
| WO | WO2011/021852 A2 | 2/2011 |
| WO | WO 2012/118269 | 9/2012 |

OTHER PUBLICATIONS

Qualcomm Incorporated, "Details of R-PDCCH interleaver", R1-104812, 3GPP TSG-RAN WG1 #62, Madrid, Spain, Aug. 23-27, 2010.
ZTE, "Aspects on DL Control Signaling Enhancements", R1-111521, TSG-RAN WG1 #65, Barcelona, Spain, May 9-13, 2011.
Intel Corporation, "Discussions on UE-RS Based PDCCH", R1-111594, 3GPP TSG RAN WG1 Meeting #65, Barcelona, Spain, May 9-13, 2011.
Research in Motion, UK Limited, "PDCCH Enhancement Considerations", R1-111661, 3GPP TSG RAN WG1 Meeting #65, Barcelona, Spain, May 9-13, 2011.
Chinese Office Action dated Jul. 25, 2014.
ZTE, "PDCCH blind decoding and search space on SCC," 3GPP TSG-RAN WG1 #61bis, pp. 1-2, Dresden, Germany, Jun. 28-Jul. 2, 2010.
International Search Report for PCT/IB2012/001661 dated Feb. 7, 2013.
LG-Nortel, "Consideration regarding the number of REGs in R-PDCCH", R1-103144, 3GPP TSG RAN WG1 #61, Montreal Canada, May 10-14, 2010.
ZTE, "PDCCH Blind decoding and search space on SCC", R1-104552, 3GPP TSG RAN WG1 #62, Madrid, Spain, Aug. 23-27, 2010.
Samsung, "PDCCH Extension to Support Operation with CI", R1-094082, 3GPP TSG-RAN WG1#58bis, Miyazaki, Japan, Oct. 12-16, 2009.

* cited by examiner

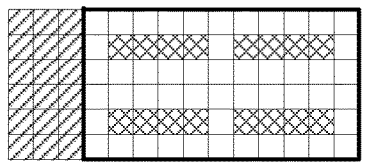
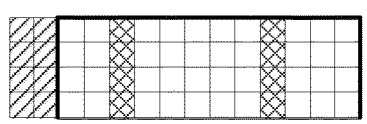
FIG.1(a)       FIG.1(b)
FIG.2
FIG.3

METHOD OF AND APPARATUS FOR PRE-CODED PHYSICAL DOWNLINK CONTROL CHANNEL REFERENCE SIGNAL AND BLIND DECODING

FIELD OF THE INVENTION

The present disclosure relates to a physical downlink control channel and particularly to a method of and apparatus for a user equipment-specific pre-coded physical downlink control channel reference signal and blind decoding.

BACKGROUND OF THE INVENTION

First three OFDM symbols in a sub-frame are occupied by a traditional Physical Downlink Control Channel (PDCCH), and the entire bandwidth of a system is occupied by these three OFDM symbols. For traditional PDCCH signaling, channel estimation is performed with a Common Reference Signal (CRS).

It is proposed in the 3GPP R10 relay standard to embed a PDCCH into a Physical Downlink Shared Channel (PDSCH) through Frequency Division Multiplexing (FDM) manner, and the PDCCH embedded into the PDSCH is also referred to as an R-PDCCH.

As compared with an R-PDCCH, a PDCCH based upon user equipment pre-coding, i.e., a U-PDCCH, has the following features:

The link quality between a base station and a user equipment may be not so strong as that between the base station and a relay base station, and therefore how to guarantee a BLock Error Rate (BLER) of U-PDCCH detection is an important issue.

The number of UEs number may far exceed the number of RNBs, and U-PDCCH allocation may be more dynamic. Therefore U-PDCCH resource allocation is another issue as compared to R-PDCCH.

Furthermore since channel pre-coding is performed on a U-PDCCH, for example, through Beam Forming (BF), and non-codebook based pre-coding is not supported for a CRS, so channel estimation on the U-PDCCH can not be performed with a CRS.

SUMMARY OF THE INVENTION

According to a first aspect of the invention, there is provided a method of transmitting a demodulation reference signal in a base station of a wireless communication network, the demodulation reference signal being used for demodulating physical downlink control channel signaling, wherein the physical downlink control channel signaling is embedded into a physical downlink shared channel, and the method includes: transmitting the demodulation reference signal to a user equipment, wherein the demodulation reference signal is included in a control channel element.

According to a second aspect of the invention, there is provided a method of receiving a demodulation reference signal in a user equipment of a wireless communication network, wherein the demodulation reference signal is used for demodulating physical downlink control channel signaling, and wherein the physical downlink control channel signaling is embedded into a physical downlink shared channel, and the method includes: receiving the demodulation reference signal from a base station, wherein the demodulation reference signal is included in a control channel element.

According to a third aspect of the invention, there is provided a method, in a base station of a wireless communication network, of assisting a user equipment in blind decoding, wherein the method includes the step of: providing the user equipment with blind decoding indication information, the blind decoding indication information including an indication of a search space in which the user equipment performs the blind decoding, wherein the search space includes a control channel element of a traditional physical downlink control channel and further includes a control channel element of a pre-coded physical downlink control channel.

According to a fourth aspect of the invention, there is provided a method of blind decoding in a user equipment of a wireless communication network, wherein the method comprises the steps of: obtaining blind decoding indication information from a base station, the blind decoding indication information including an indication of a search space in which the user equipment performs the blind decoding, wherein the search space includes a control channel element of a traditional physical downlink control channel and further includes a control channel element of a pre-coded physical downlink control channel; and performing the blind decoding for the number of searches indicated by the blind decoding indication information in the search space indicated by the blind decoding indication information, according to the blind decoding indication information.

According to a fifth aspect of the invention, there is provided a first apparatus for transmitting a demodulation reference signal in a base station of a wireless communication network, the demodulation reference signal being used for demodulating physical downlink control channel signaling, wherein the physical downlink control channel signaling is embedded into a physical downlink shared channel, and the first apparatus includes: a transmitter configured to transmit the demodulation reference signal to a user equipment, wherein the demodulation reference signal is included in a control channel element.

According to a sixth aspect of the invention, there is provided a second apparatus for receiving a demodulation reference signal in a user equipment of a wireless communication network, wherein the demodulation reference signal is used for demodulating physical downlink control channel signaling, and wherein the physical downlink control channel signaling is embedded into a physical downlink shared channel, and the second apparatus includes: a receiver configured to receive the demodulation reference signal from a base station, wherein the demodulation reference signal is included in a control channel element.

According to a seventh aspect of the invention, there is provided a third apparatus, in a base station of a wireless communication network, for assisting a user equipment in blind decoding, wherein the third apparatus includes: a providing device configured to provide the user equipment with blind decoding indication information, the blind decoding indication information including an indication of a search space in which the user equipment performs the blind decoding, wherein the search space includes a control channel element of a traditional physical downlink control channel and further includes a control channel element of a pre-coded physical downlink control channel.

According to an eighth aspect of the invention, there is provided a fourth apparatus for blind decoding in a user equipment of a wireless communication network, wherein the fourth apparatus includes: an obtaining device configured to obtain blind decoding indication information from a base station, the blind decoding indication information including an indication of a search space in which the user equipment performs the blind decoding, wherein the search space includes a control channel element of a traditional physical downlink control channel and further includes a control channel element of a pre-coded physical downlink control channel; and a blinding decoder configured to perform the blind decoding in the search space indicated by the blind decoding indication information according to the blind decoding indication information.

With the solutions of the invention, a design solution to a DeModulated Reference Signal (DMRS) of a U-PDCCH is proposed so that the DMRS for demodulating the U-PDCCH is more compact, thereby saving signaling overhead of an RS. Furthermore in a preferred embodiment, when user equipments perform blind decoding for PDCCH, the user equipments of different versions can perform blind decoding starting from different starting locations, that is to say, a priority is set for CCE resource of PDCCH occupied for the user equipment, thereby further optimizing resource allocation.

BRIEF DESCRIPTION OF DRAWINGS

Other features, objects and advantages of the invention will become more apparent from the following detailed description of non-limiting embodiments with reference to the drawings in which:

FIG. 1(a) and FIG. 1(b) illustrate design patterns of demodulation reference signals for demodulating PDCCH signaling according to two embodiments of the invention respectively;

FIG. 2 illustrates a schematic diagram of a search space and a search sequence for blind decoding of a PDCCH according to an embodiment of the invention;

FIG. 3 illustrates a schematic diagram of a search space and a search sequence for blind decoding of a PDCCH according to an embodiment of the invention;

Wherein, identical or similar reference numerals denote identical or similar step features or devices/modules.

DETAILED DESCRIPTION OF EMBODIMENTS

Figure 4:
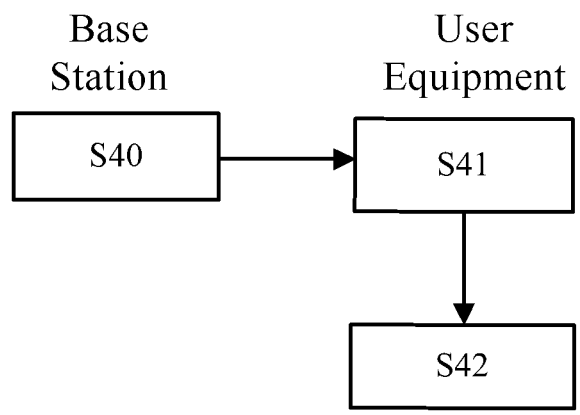
FIG. 4 illustrates a flow chart of a system method according to an embodiment of the invention.

FIG. 1(a) and FIG. 1(b) illustrate design patterns of demodulation reference signals for demodulating PDCCH signaling according to two embodiments of the invention respectively.

In general, a PDCCH is transmitted in one or more Control Channel Elements (CCEs). Particularly each CCE corresponds to nine sets of Resource Element Groups (REGs), and each set of REGs include four Physical Resource Elements (REs), that is, each CCE includes fixed 36 Res.

A mapping between a CCE of a traditional PDCCH and a Physical Resource Block (PRB) is discrete, that is, CCEs are discretely distributed throughout a frequency band. However user equipment-specific beam forming is performed for a U-PDCCH, that is, data is transmitted to a specific user equipment through beam forming, that is, beam forming is narrowband oriented. Therefore the traditional discrete mapping between a CCE and a PRB is not applicable to the scenario of a U-PDCCH. In view of this, the applicants considers that the design of an R-PDCCH can be made use of, that is, a first Time Slot (TS) is used for downlink scheduling and a second time slot is used for uplink scheduling through time division multiplexing.

For a design of a reference signal, a reference signal of a U-PDCCH can generally be designed in at least the following two approaches. That is, a CRS reference signal is reused, and a demodulation reference signal is used for channel estimation of the U-PDCCH, that is, the U-PDCCH is demodulated with a DMRS. For CRS demodulation of the U-PDCCH, the design of an R-PDCCH can be reused, and therefore a repeated description thereof will be omitted here. In this context, a discussion will be focused on a design of a DMRS for demodulating a U-PDCCH.

The following two factors shall be considered in a design of a DMRS for demodulating a U-PDCCH:

1. The smallest granularity of a U-PDCCH is a CCE instead of a pair of PRBs or one bundled PRBs.

2. A different DMRS density of a PDCCH from a PCSCH may be required.

Therefore the design of a DMRS for demodulating a U-PDCCH shall be optimized to design a CCE-specific DMRS structure, that is, each CCE includes a separate DMRS.

In a method according to this embodiment, a base station (eNB) is configured to transmit a DMRS for demodulating PDCCH signaling, where the PDCCH signaling is embedded into a PDSCH, and the method includes: transmitting the DMRS to a User Equipment (UE), where the DMRS is included in a CCE.

Then the user equipment receives the DMRS for demodulating the PDCCH signaling, where the PDCCH signaling is embedded into the PDSCH, and the method includes: receives the DMRS from the base station, where the DMRS is included in a CCE.

FIG. 1(a) and FIG. 1(b) illustrate design patterns of demodulation reference signals for demodulating PDCCH signaling according to two embodiments of the invention respectively.

Particularly in FIG. 1(a) and FIG. 1(b), two or three CCEs are multiplexed respectively onto the same pair of PRBs through frequency division multiplexing. Noted resource elements filled with an oblique line represent resource elements occupied by a traditional PDCCH, and resource element filled with oblique crossing lines represent resource elements reserved for reference signals. Therefore each CCE includes all of resource elements in the range of black box lines other than resource elements reserved for a DMRS. A pair of PRBs includes twelve sub-carriers and fourteen OFDM symbols. Noted six sub-carriers are occupied by a CCE in FIG. 1(a), and therefore a pair of PRBs includes two CCEs. Four sub-carriers are occupied by a CCE in FIG. 1(b), and therefore a pair of PRBs includes three CCEs.

The design of a DMS for a U-PDCCH has been detailed above, and a process for a user equipment to perform U-PDCCH based blind decoding will be further described below.

In the traditional blind decoding technology, a set of CCE locations at which a user equipment may detect a PDCCH can be referred to as a "search space". In the LTE, the sizes of a search space vary with different PDCCH formats, i.e., different PDCCH levels. Furthermore a dedicated search space and a common search space are defined which are separate, where the dedicated search space is configured specially for a user equipment, and the common search space is notified to all of user equipments. It is noted that dedicated and common search spaces may overlap for a specific UE. The sizes of dedicated and common search spaces are listed in Table 1 below.

TABLE 1

| Level | The number of CCEs | The candidate number of common search spaces | The candidate number of dedicated search spaces |
|---|---|---|---|
| 1 | 1 | | 6 |
| 2 | 2 | | 6 |
| 4 | 4 | 4 | 2 |
| 8 | 8 | 2 | 2 |

In the prior art, a UE performs at most 44 times of blind decoding over any sub-frame.

The traditional blind decoding mechanism shall be reused for a U-PDCCH, but the following two issues shall be addressed to reuse the traditional blind decoding mechanism:

1. How to guarantee a similar number of rounds of blind decoding with that of an R10 system; and
2. How to guarantee a blind decoding rule.

Therefore the inventors propose two blind decoding solutions in this application.

First Solution:

Existing PDCCH and U-PDCCH resources are combined together to form a new extended PDCCH search space applicable to a user equipment of R11 and above, where all of existing defined blind decoding mechanisms can be reused with only the following modification:

The number of searches for a CCE in the search space is modified to:

$$N_{CCE,k} = N_{CCE,k}^{PDCCH} + N_{CCE,k}^{U\text{-}PDCCH}$$

Where $N_{CCE,k}^{PDCCH}$, $N_{CCE,k}^{U\text{-}PDCCH}$ represents the number of CCEs in a traditional PDCCH search space and the number of CCEs in a U-PDCCH search space respectively. This solution is as illustrated in FIG. 2. In FIG. 2, 24 CCEs numbered 0 to 23 represent CCEs occupied by a traditional PDCCH, and 12 CCEs numbered 24 to 35 represent CCEs occupied by a U-PDCCH. As depicted in Table 1, one CCE is occupied by a PDCCH at the level 1, two CCEs are occupied by a PDCCH at the level 2, four CCEs are occupied by a PDCCH at the level 4, and eight CCEs are occupied by a PDCCH at the level 8. The number 1 at each level represents a UE-specific CCE search space, and a blank preceding the number 1 represents a common search space. That is, there are six CCEs at the level 1 for a common search, four CCEs at the level 2 for a common search, four CCEs at the level 4 for a common search, and two CCEs at the level 8 for a common search. Of course, since a UE typically performs only 44 searches (including repeated two times), it is impossible to perform blind decoding for all the CCEs, and therefore as can be seen from FIG. 2, blind decoding is performed for only a part of the CCEs, and a CCE which is numbered in FIG. 2 represents a CCE for which a user equipment performs user equipment-specific blind decoding. Those skilled in the art can appreciate that all the numbers of searches at the respective levels are illustrative. In a practical application, a network operator totally can configure them dependent upon a particular network operating condition.

The first solution is easy to implement. However as can be seen from FIG. 1, CCE of U-PDCCH is included only at the level 8, but no CCE of U-PDCCH is included at the other levels 1, 2 and 4. Therefore this solution may result in imbalance of CCEs because only user equipments of R11 and above can use U-PDCCH and these user equipments of R11 and above have the same priority as user equipments of R10 and below in terms of sharing a traditional PDCCH resource.

Second Solution:

FIG. 3 illustrates a schematic diagram of a search space and a search sequence for blind decoding of a PDCCH according to another embodiment of the invention.

With $N_{BD}^{Traditional} = N_{BD}^{PDCCH} + N_{BD}^{U\text{-}PDCCH}$, a base station may configure the numbers of times of blind decoding respectively over a U-PDCCH and a traditional PDCCH.

Where $N_{BD}^{Traditional}$, $N_{BD}^{PDCCH}$, $N_{BD}^{U\text{-}PDCCH}$ represent respectively the number of times of blind decoding for a traditional PDCCH, the total number of times of blind decoding for a PDCCH in the invention and the number of times of blind decoding for a U-PDCCH. Search spaces are defined respectively as $$S_k^{(L),U\text{-}PDCCH} = L \cdot \{(Y_k^{U\text{-}PDCCH} + m_1) \bmod \lfloor N_{CCE,k}^{U\text{-}PDCCH}/L \rfloor\} + i$$

$$S_k^{(L),PDCCH} = L \cdot \{(Y_k^{PDCCH} + m_2) \bmod \lfloor N_{CCE,k}^{PDCCH}/L \rfloor\} + i.$$

Particularly L represents an aggregation level, i.e., the levels 1, 2, 4 and 8, $Y_k$ represents a starting location, as its relevant definition may be found in TS36.213 V9.2.0. $m_1 = 0 \sim N_{BD}^{U\text{-}PDCCH} - 1$, $m_2 = 0 \sim N_{BD}^{PDCCH} - 1$ and $i = 0 \sim L-1$.

As can be seen from FIG. 3, user equipments of R11 and above firstly perform blind decoding starting from CCEs of U-PDCCH, and if blind decoding succeeds, then these user equipments will not perform blind decoding any further on CCEs of traditional PDCCH. Therefore these user equipments will not occupy any CCE resource of traditional PDCCH.

FIG. 4 illustrates a flow chart of a system method according to an embodiment of the invention. Firstly in the step S40, a base station provides a user equipment with blind decoding indication information, the blind decoding indication information including an indication of a search space in which the user equipment performs blind decoding, wherein the search space includes a control channel element of a traditional physical downlink control channel and further includes a control channel element of a pre-coded physical downlink control channel.

In another embodiment, the blind decoding indication information further includes an indication of a starting location in the search space at which the user equipment performs blind decoding.

In another embodiment, the blind decoding indication information further includes an indication of the numbers of searches respectively in the search space of the traditional physical downlink control channel and the search space of the pre-coded physical downlink control channel.

Furthermore the base station may notify the user equipment of the blind decoding indication information explicitly or implicitly.

In an explicit manner, for example, the base station may transmit an instruction to the user equipment, the instruction including the blind decoding indication information.

In an implicit manner, for example, the base station may not transmit the blind decoding indication information directly, but can associate the blind decoding indication information with other system parameters. For example, the blind decoding indication information may be associated with a system bandwidth. In an example, the higher the bandwidth, the larger the search spaces and the numbers of searches for blind decoding. Furthermore the base station may further notify the user equipment, in a predefined manner, of a current search space, a starting location in the search space at which the user equipment performs blind decoding, and the number of searches in the search space.

Furthermore the number of searches for a traditional PDCCH and the number of searches for a U-PDCCH may be adjusted.

Then in the step S41, the user equipment obtains blind decoding indication information from the base station, the blind decoding indication information including the indication of the search space in which the user equipment performs blind decoding, wherein the search space includes the control channel element of the traditional physical downlink control channel and further includes the control channel element of the pre-coded physical downlink control channel.

Then in the step S42, the user equipment performs blind decoding in the search space indicated by the blind decoding indication information according to the blind decoding indication information.

In a preferred embodiment, the blind decoding indication information further includes the indication of a starting location in the search space at which the user equipment performs blind decoding, and therefore the step S42 further includes: performing blind decoding at the starting location.

In another embodiment, the blind decoding indication information further includes the indication of the numbers of searches respectively in the search space of the traditional physical downlink control channel and the search space of the pre-coded physical downlink control channel, and the step S42 further includes: performing blind decoding respectively in the search space of the physical downlink control channel and the search space of the pre-coded physical downlink control channel according to the numbers of searches respectively in the search space of the physical downlink control channel and the search space of the pre-coded physical downlink control channel indicated by the blind decoding indication information In another embodiment, the numbers of searches for the traditional PDCCH and the number of searches for the U-PDCCH may be adjusted.

In another embodiment, the blind decoding indication information can notify the user equipment of a current search space, a starting location in the search space at which the user equipment performs blind decoding and the number of searches in the search space, in an implicit indication manner, via predefined parameters or via association with system parameters. That is, the blind decoding indication information is predefined in the network, and therefore the user equipment obtains the blind decoding indication information from the predefined parameters. In another embodiment, when the blind decoding indication information is associated with system parameters, the user equipment may obtain the blind decoding indication information from the system parameters.

The invention has been detailed above from the perspective of a method flow. The invention will be described below respectively with reference to FIG. 5 and FIG. 6 from the perspective of an apparatus.

Figure 5:
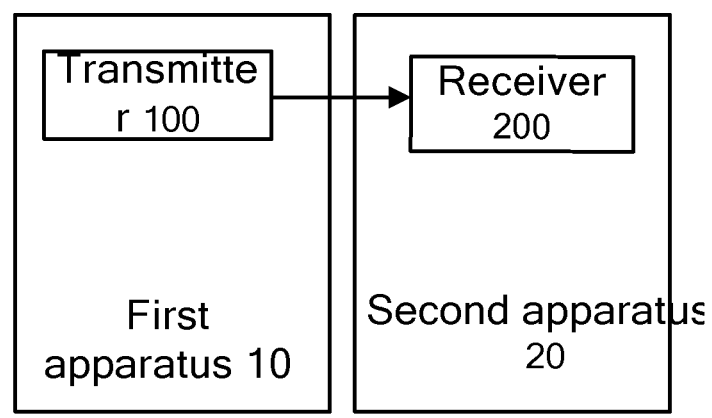
FIG. 5 illustrates a block diagram of an apparatus according to an embodiment of the invention.

A first apparatus 10 in FIG. 5 is located in a base station to transmit a demodulation reference signal, the demodulation reference signal being used for demodulating physical downlink control channel signaling, where the physical downlink control channel signaling is embedded in a physical downlink shared channel, and the first apparatus 10 includes: a transmitter 100 configured to transmit the demodulation reference signal to a user equipment, where the demodulation reference signal is included in a control channel element.

A second apparatus 20 in FIG. 5 is located in a user equipment to receive a demodulation reference signal, wherein the demodulation reference signal is used for demodulating physical downlink control channel signaling, and wherein the physical downlink control channel signaling is embedded in a physical downlink shared channel, and the second apparatus 20 includes a receiver 200 configured to receive the demodulation reference signal from a base station, wherein the demodulation reference signal is included in a control channel element.

Figure 6:
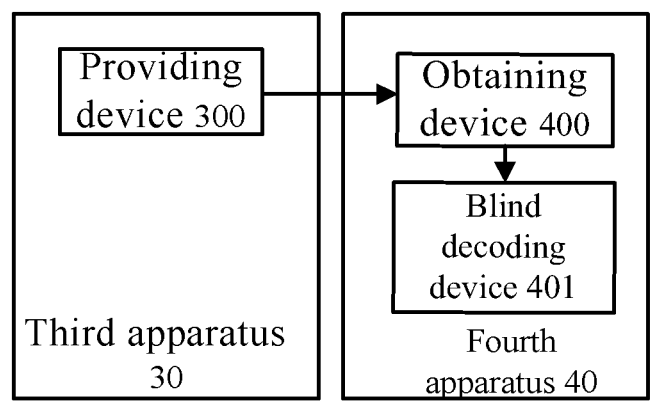
FIG. 6 illustrates a block diagram of an apparatus according to an embodiment of the invention.

A third apparatus 30 in FIG. 6 is located in a base station to assist a user equipment in blind decoding, wherein the third apparatus 30 includes: a providing device 300 configured to provide the user equipment with blind decoding indication information, the blind decoding indication information including an indication of a search space in which the user equipment performs blind decoding, wherein the search space includes a control channel element of a traditional physical downlink control channel and further includes a control channel element of a pre-coded physical downlink control channel.

A fourth apparatus 40 in FIG. 6 is located in a user equipment to perform blind decoding, wherein the fourth apparatus 40 includes: an obtaining device 400 configured to obtain blind decoding indication information from a base station, the blind decoding indication information including an indication of a search space in which the user equipment performs blind decoding, wherein the search space includes a control channel element of a traditional physical downlink control channel and further includes a control channel element of a pre-coded physical downlink control channel; and a blinding decoder 401 configured to perform blind decoding in the search space indicated by the blind decoding indication information according to the blind decoding indication information.

The embodiments of the invention have been described above, but the invention will not be limited to any specific system, device and protocol, and those skilled in the art can make various variations or modifications without departing from the scope of the invention.

Those ordinarily skilled in the art can understand and practice other changes to the disclosed embodiments upon review of the description, the disclosure and the drawings as well as the appended claims. In the claims, the term "comprising" will not preclude another element(s) and step(s), and the term "a" or "an" will not preclude plural. In the invention, "first" and "second" merely represent a name but not any sequential relationship. In a practical application of the invention, an element may perform functions of a plurality of technical features recited in a claim. Any reference numerals in the claims shall not be construed as limiting the scope of the invention.

The invention claimed is:

1. A method, in a base station of a wireless communication network, of assisting a user equipment in blind decoding, wherein the method comprises:
   providing the user equipment with blind decoding indication information, the blind decoding indication information including an indication of a search space in which the user equipment performs the blind decoding for notifying the user equipment of a current search space, a starting location in the search space at which the user equipment performs the blind decoding and the number of searches in the search space, in an implicit indication manner, via predefined parameters or via association with system parameters, wherein the search space comprises a control channel element of a traditional physical downlink control channel and further comprises a control channel element of a pre-coded physical downlink control channel, wherein the blind decoding indication information further comprises an indication of the numbers of searches respectively in the search space of the traditional physical downlink control channel and the search space of the pre-coded physical downlink control channel for performing blind decoding respectively in the search space of the traditional physical downlink control channel and the search space of the pre-coded physical downlink control channel according to the numbers of searches respectively in the search space of the traditional physical downlink control channel and the search space of the pre-coded physical downlink control channel indicated by the blind decoding indication information.

2. The method according to claim 1, wherein the blind decoding indication information further comprises an indication of a starting location in the search space at which the user equipment performs the blind decoding.

3. The method according to claim 1, wherein the number of searches of the traditional physical downlink control channel and the number of searches of the pre-coded physical downlink control channel are adjustable.

4. A method of blind decoding in a user equipment of a wireless communication network, wherein the method comprises:
   obtaining blind decoding indication information from a base station, the blind decoding indication information including an indication of a search space in which the user equipment performs the blind decoding for notifying the user equipment of a current search space, a starting location in the search space at which the user equipment performs the blind decoding and the number of searches in the search space, in an implicit indication manner, via predefined parameters or via association with system parameters, wherein the search space comprises a control channel element of a traditional physical downlink control channel and further comprises a control channel element of a pre-coded physical downlink control channel, and wherein the blind decoding indication information further comprises an indication of the numbers of searches respectively in the search space of the traditional physical downlink control channel and the search space of the pre-coded physical downlink control channel for performing blind decoding respectively in the search space of the traditional physical downlink control channel and the search space of the pre-coded physical downlink control channel according to the numbers of searches respectively in the search space of the traditional physical downlink control channel and the search space of the pre-coded physical downlink control channel indicated by the blind decoding indication information;
   performing the blind decoding in the search space indicated by the blind decoding indication information according to the blind decoding indication information; and
      performing the blind decoding respectively in the search space of the traditional physical downlink control channel and the search space of the pre-coded physical downlink control channel according to the numbers of searches respectively in the search space of the traditional physical downlink control channel and the search space of the pre-coded physical downlink control channel indicated by the blind decoding indication information.

5. The method according to claim 4, wherein the blind decoding indication information further comprises an indication of a starting location in the search space at which the user equipment performs the blind decoding; and
   further comprises:
      performing the blind decoding at the starting location.

6. The method according to claim 4,
   further comprising: obtaining the blind decoding indication information from the predefined parameters or the system parameters.

7. A base station of a wireless communication network, for assisting a user equipment in blind decoding, wherein the base station comprises:
   a first apparatus including a transmitter configured to transmit a demodulation reference signal to a user equipment, where the demodulation signal is included in a control channel element; and
   a third apparatus including a providing device configured to provide the user equipment with blind decoding information, the blind decoding indication information including an indication of a search space in which the user equipment performs the blind decoding configured for notifying the user equipment of a current search space, a starting location in the search space at which the user equipment performs the blind decoding and the number of searches in the search space, in an implicit indication manner, via predefined parameters or via association with system parameters, wherein the search space comprises a control channel element of a traditional physical downlink control channel and further includes a control channel element of a pre-coded physical downlink control channel, wherein the blind decoding indication information further comprises an indication of the numbers of searches respectively in the search space of the traditional physical downlink control channel and the search space of the pre-coded physical downlink control channel configured for performing blind decoding respectively in the search space of the traditional physical downlink control channel and the search space of the pre-coded physical downlink control channel according to the numbers of searches respectively in the search space of the traditional physical downlink control channel and the search space of the pre-coded physical downlink control channel indicated by the blind decoding indication information.

8. A user equipment of a wireless communication network, wherein the user equipment comprises:
   a second apparatus including a receiver configured to receive a demodulation reference signal from a base station, wherein the demodulation reference signal is included in a control channel element; and
   a fourth apparatus including an obtaining device configured to obtain blind decoding indication information from a base station, the blind decoding indication information including an indication of a search space in which the user equipment performs the blind decoding configured for notifying the user equipment of a current search space, a starting location in the search space at which the user equipment performs the blind decoding and the number of searches in the search space, in an implicit indication manner, via predefined parameters or via association with system parameters, wherein the search space comprises a control channel element of a traditional physical downlink control channel and further includes a control channel element of a pre-coded physical downlink control channel, and wherein the blind decoding indication information further comprises an indication of the numbers of searches respectively in the search space of the traditional physical downlink control channel and the search space of the pre-coded physical downlink control channel configured for performing blind decoding respectively in the search space of the traditional physical downlink control channel and the search space of the pre-coded physical downlink control channel according to the numbers of searches respectively in the search space of the traditional physical downlink control channel and the search space of the pre-coded physical downlink control channel indicated by the blind decoding indication information; and wherein the fourth apparatus further includes a blind decoding device configured to perform blind decoding in the search space indicated by the blind decoding indication information according to the blind decoding indication information and blind decoding respectively in the search space of the traditional physical downlink control channel and the search space of the pre-coded physical downlink control channel according to the numbers of searches respectively in the search space of the traditional physical downlink control channel and the search space of the pre-coded physical downlink control channel indicated by the blind decoding indication information.

\* \* \* \* \*